United States Patent [19]

Moore et al.

[11] Patent Number: 4,458,857
[45] Date of Patent: Jul. 10, 1984

[54] SECURITY DEVICE FOR USE WITH MAGNETIC TAPE REELS

[75] Inventors: Milton M. Moore; Christopher N. MacDonald, both of Costa Mesa, Calif.

[73] Assignees: Vesta J. Crow, Long Beach; Mark G. Moore, Costa Mesa, both of Calif. ; a part interest

[21] Appl. No.: 418,614

[22] Filed: Sep. 16, 1982

[51] Int. Cl.³ .................... G03B 1/04; G11B 15/32; B60Q 1/00
[52] U.S. Cl. .................... 242/197; 340/568; 360/134
[58] Field of Search ............ 242/71.8, 71.9, 197–200; 360/60, 118, 134; 340/174 LB, 267 R

[56] References Cited

U.S. PATENT DOCUMENTS 3,688,057  8/1972  Lee ........................... 360/60
3,688,300  8/1972  Whysong et al. ............ 340/267 R
4,063,292 12/1977  Karsh ......................... 360/60

OTHER PUBLICATIONS

IBM Technical Disclosure Bulletin, vol. 8, No. 10, Mar. 1966, Visual Indicator for Tape Reel, p. 1427, G. L. Smith.

Primary Examiner—Leonard D. Christian
Attorney, Agent, or Firm—Fulwider, Patton, Rieber, Lee & Utecht

[57] ABSTRACT

Magnetic tape reels, using file protect rings disposed within an annular channel concentric with the spindle opening within the tape reel, can be provided with a unique, access coding by defining a first plurality of recesses or projections on the bottom surface of the annular channel and a corresponding and mating second plurality of projections or recesses on the bottom and opposing surface of the file protect ring. The pattern of recesses, projections or both defined within the annular channel and on the bottom surface of the file protect ring uniquely associates each file protect ring with each tape reel such that a given ring will fit flushly with only one reel. A conventional electromechanical actuator senses whether or not the file protect ring is appropriately and flushly disposed within the channel, thereby preventing erasure or overwriting on the tape. Reading of the contents of a magnetic tape reel can also be prevented in the case where one or more projections are provided on the bottom surface of the annular channel and extend to the upper edges of the channel, thereby providing a physical obstruction to the actuator and preventing rotation of the reel.

11 Claims, 7 Drawing Figures

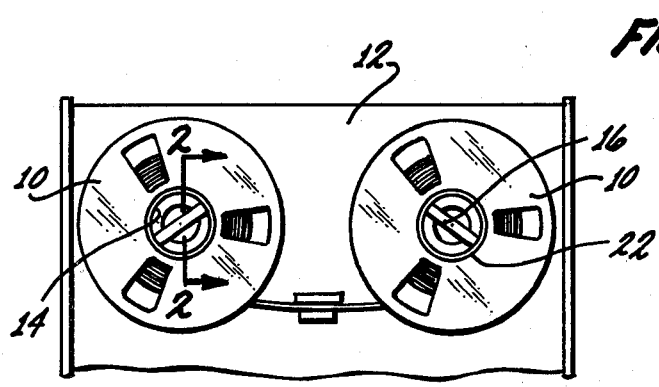
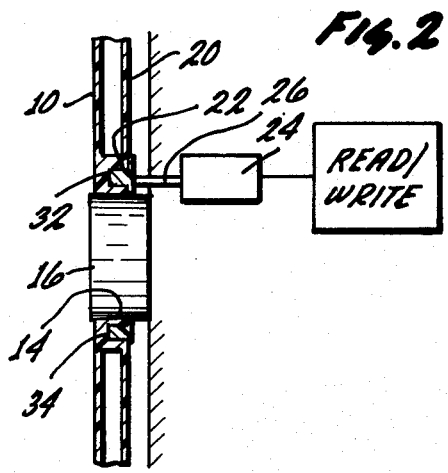
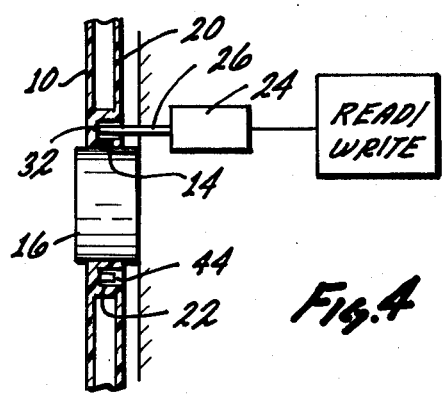
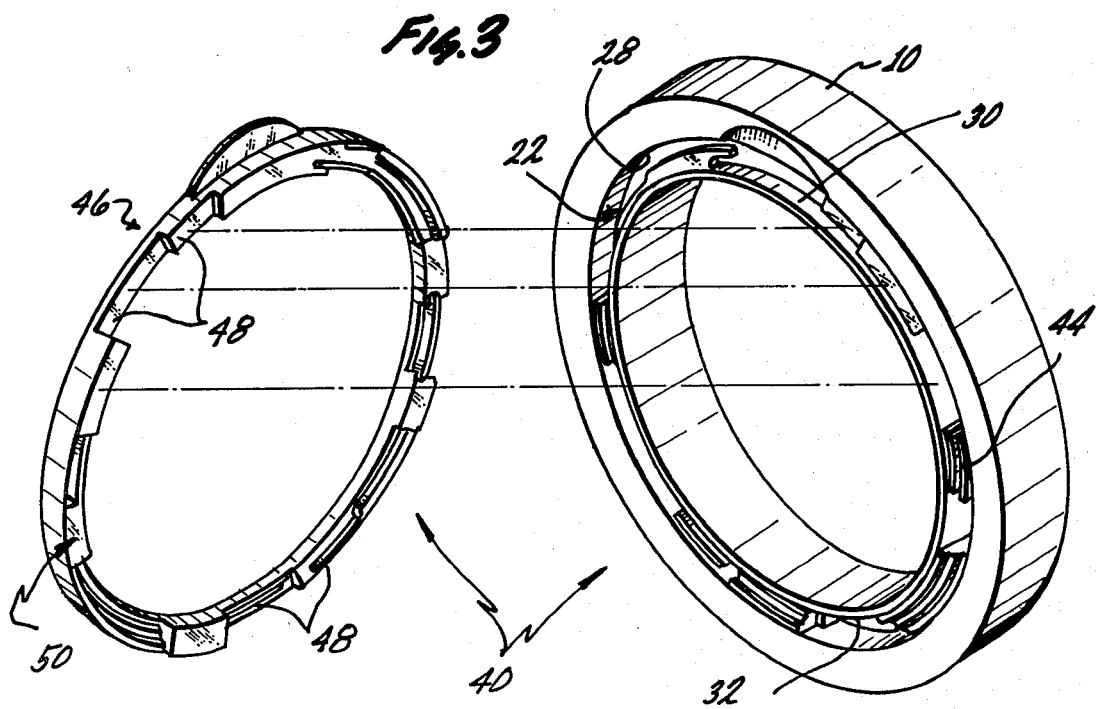

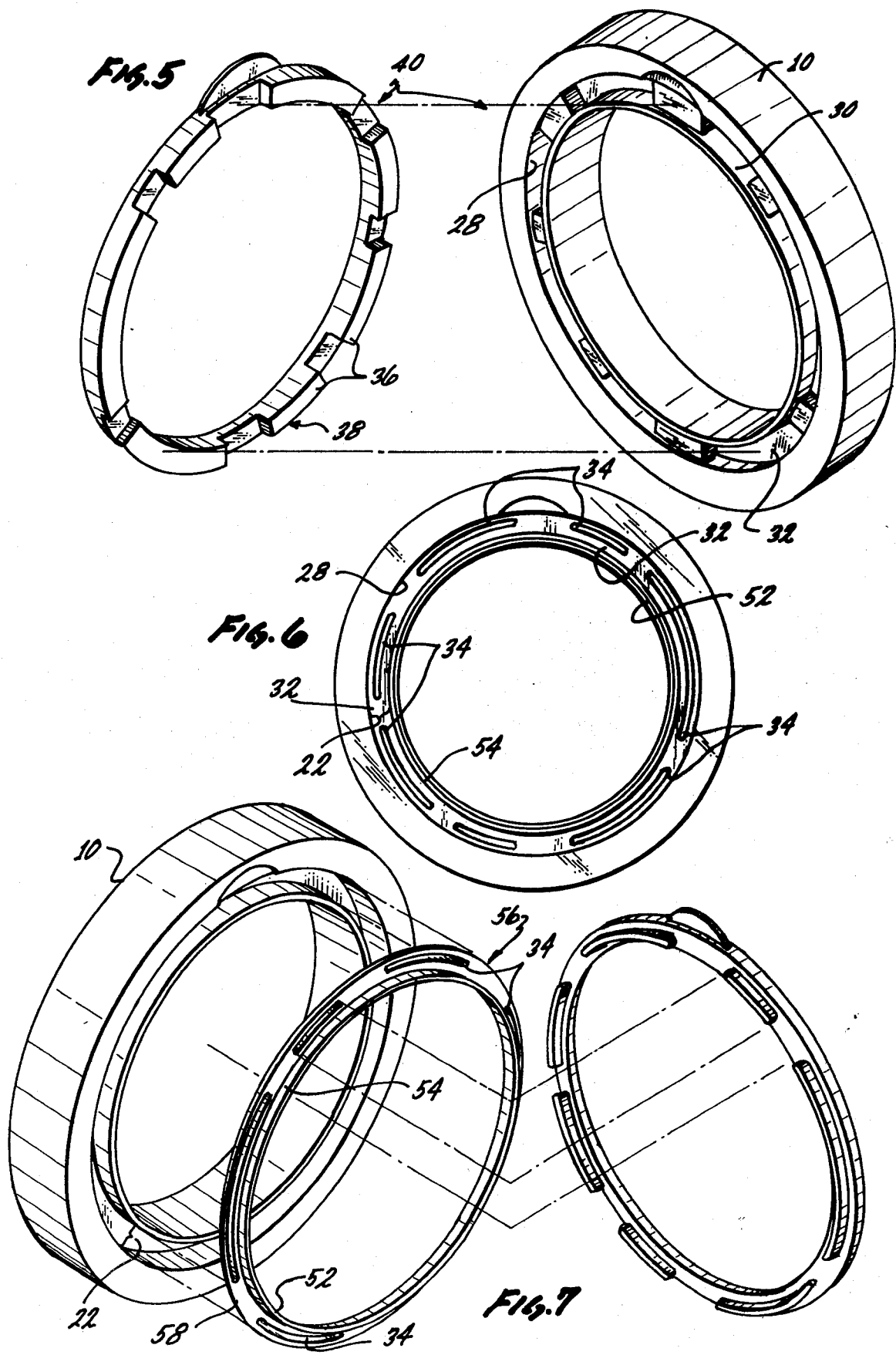

SECURITY DEVICE FOR USE WITH MAGNETIC TAPE REELS

BACKGROUND OF THE INVENTION

1. Field of the Invention

The present invention relates to the field of security devices for computer magnetic tape reels, and in particular relates to the protection of information stored on reeled magnetic tape by means of a coded file protect ring.

2. Description of the Prior Art

The use of file protect rings in combination with magnetic tape reels for protection of the information stored on the tape is well known in the art. In its simplest form, the file protect ring, as shown in IBM Technical Disclosure Bulletin, Vol. 8, No. 10, March 1966, is an annular ring concentric with a central spindle opening of the tape reel, which annular ring is disposed within a corresponding annular groove defined with the tape reel. The ring thus allows the groove to be filled and the file protect ring forms part of the flush surface of the inside surface of the reel. The reel, with its flush surface as completed by the file protect ring, is then mounted on a tape recorder for reading or writing. With the file protect ring in place, a switch of the general types such as shown in Lee, "Erasure Prevention Control for Magnetic Tape Reels Having a Safety Ring to Prevent Insertion of a File Protect Ring", U.S. Pat. No. 3,688,057, bears against the flush surface of the file protect ring thereby assuming what is defined an actuating position to allow the tape to be erased or recorded upon. If the ring were not present, the switch assumes a nonactuated position and the tape cannot be written upon.

Clearly, in a simple device such as a gasket or ring disposed in a mating annular channel, any such file protect ring will fit any tape reel. Although such ring provides a means for preventing some operator errors, it provides no means for preventing intentional unauthorized erasure, reading or writing on the magnetic tape spooled on the reel.

What is needed then is some means whereby conventional magnetic tape reels which use such file protect rings, may be provided with some means for security or for selectively permitted erasure, reading and/or writing.

BRIEF SUMMARY OF THE INVENTION

The present invention is an improvement in a magnetic tape reel where the tape reel includes a center opening for receiving the spindle of a magnetic tape drive. The tape also has an annular channel defined therein with smooth generally circular sidewalls which are concentric with the center opening. The annular channel also has a bottom wall which is generally perpendicular to the sidewalls. The channel is used to receive a switch actuator. The actuator has a path of travel into the channel between a switch actuating position which is generally flush with the upper side of the magnetic tape reel and which lies approximately in the plane which includes the upper edge of the annular channel and has a switch nonactuating position within the channel wherein the switch actuator extends into the channel, at least for a partial depth. The annular channel also provides a means for gripping a soft and resilient protect ring. The file protect ring positions the switch actuator in the switch actuating position when the file protect ring is disposed in the annular channel.

The improvement of the present invention comprises a first plurality of surfaces selectively defined in the bottom wall of the annular channel. A second plurality of surfaces are also defined in the bottom surface of the file protect ring which is disposed adjacent to the bottom wall of the channel when the file protect ring is disposed into the channel. The second plurality of surfaces correspond with and mate with the first plurality of surfaces defined in the bottom wall of the channel. The correspondence between the first and second plurality of surfaces is a one-to-one correspondence. Therefore, the file protect ring can be disposed in the annular channel in only one unique position as defined by the unique mating of the first and second plurality of surfaces. If the first and second plurality of surfaces don't mate exactly, the file protect ring cannot be disposed in the annular channel in a position which allows the file protect ring to lie completely flush with the upper side of the reel. When this is the case, the tape cannot be placed upon the magnetic tape drive without wobble, jamming, or other serious impediment to its practical operation. By means of this combination of elements, each magnetic tape reel is uniquely keyed and coded to a corresponding file protect ring. Therefore, one cannot read, write or erase material stored on the magnetic tape which is spooled on the reel unless he has in his possession that file protect ring uniquely coded to that corresponding magnetic tape reel.

As described in greater detail in connection with the following Figures and the Detailed Description of the Preferred Embodiments, the first and second plurality of surfaces may contain various combinations of recesses and projections defined in either the bottom wall of the annular channel and in the bottom surface of the file protect ring. The mating surfaces can be formed into the magnetic tape reel and file protect ring when originally manufactured, or can be retrofitted to a conventional magnetic tape reel by forming the coding surfaces in an insert, which is affixed to and disposed in the annular channel of a conventional, uncoded magnetic tape reel.

BRIEF DESCRIPTION OF THE DRAWINGS

FIG. 1 is a plan view of a tape reel mounted on a tape recorder showing the environment of the present invention.

FIG. 2 is a cross section taken through 2—2 of FIG. 1 in enlarged scale showing the disposition of the actuator within an annular channel incorporating one embodiment of the present invention.

FIG. 3 is a perspective view of a file protect ring for use in combination with the first embodiment illustrated in FIG. 2.

FIG. 4 is a cross-sectional, fragmentary view of a tape reel taken through lines 2—2 of FIG. 1 showing a second embodiment to the present invention.

FIG. 5 is a perspective view of a file protect ring arranged and configured to be used in combination with the second embodiment of the invention illustrated in FIG. 4.

FIG. 6 is a plan view of a tape reel showing a third embodiment of the present invention wherein the width of the annular channel has been decreased.

FIG. 7 is a perspective view of an insert for retrofitting a tape reel with the third embodiment shown in FIG. 6.

DETAILED DESCRIPTION OF THE PREFERRED EMBODIMENTS

The present invention is a means for providing coded and selective access to the contents of information stored on a magnetic tape reel by means of unique coding defined on the file protect ring of a magnetic tape reel and equivalently defined in the annular channel into which the file protect ring is normally disposed.

A series of projections and recesses are selectively defined according to a uniquely coded pattern in the bottom surface of the annular channel which is normally provided in the magnetic tape reel. A file protect ring can be inserted into the annular channel only if a corresponding and mating plurality of recesses and projections are defined on the opposing, bottom surface of the file protect ring. A conventional file protect ring, having a smooth bottom surface, cannot be fully inserted into the annular channel due to obstructions created by the projections defined in the bottom surface of the annular channel. An improperly coded ring will similarly be prevented from being flushly inserted into the annular channel due to failure of the recesses and projections to perfectly mate. The inability to flushly insert a file protect ring into the annular channel will normally prevent the tape from being mounted on the tape drive.

Similarly, if the file protect ring is omitted, projections rising from the bottom surface of the annular channel will present a series of physical obstructions to the actuating switch mechanism and will therefore prevent the physical rotation of the tape reel, thereby prohibiting the contents of the tape reel from being read. In the case where the annular channel has only recesses and has no projections defined on its bottom surface, security can still be maintained by disposing a collared insert into the annular channel to decrease the width of the channel and thereby prevent the insertion of a conventional file protect ring into the annular channel.

The annular channel of a magnetic tape reel can thus be modified as just described when originally manufactured or may be retrofitted by insertion of coding rings described in more detail below.

Referring now to FIG. 1, a conventional magnetic tape reel including an annular plastic hub 10 is shown as mounted to a conventional magnetic tape drive 12. Tape reel 10 is characterized by having a central opening 14 through which a spindle 16 is inserted. Spindle 16 drives reel 10 during normal operations. Thus, reel 10 has two side surfaces, one of which is exposed in a plan view in FIG. 1 and the other of which is placed against magnetic tape drive 12 and which usually cannot be seen by the operator when reel 10 is in use.

Turning now to FIG. 2, a fragmentary sectional view of reel 10 in enlarged scale is illustrated and more clearly shows the outside reel surface 18 and inside reel surface 20. Inside reel surface 20 has an annular channel 22 defined therein which is concentric with central opening 14. A conventional switch mechanism 24 with an actuating arm 26 is disposed within annular channel 22, normally with arm 26 to a partial depth, such as half the depth of channel 22.

As better shown in FIG. 3, annular channel 22 is a concentric channel defined by a pair of generally circular, smooth sidewalls 28 and 30, and a generally smooth bottom wall 32 which is perpendicular to sidewalls 28 and 30. When a soft rubber or elastomeric file protect ring is inserted in annular channel 22, actuating rod 26 of switch 24 moves to the right as shown in FIG. 2 to an actuated position, to indicate that such a file protect ring is in place to allow erasure of writing in a conventional manner. With the file protect ring not in place, as illustrated in FIG. 2, actuating rod 26 moves to the left as shown in FIG. 2 to its full extension within annular channel 22.

In the embodiment of FIGS. 2 and 5, bottom surface 32 of channel 22 has a first plurality of recesses 34 defined in bottom wall 32. Referring now to FIG. 5, a corresponding and mating second plurality of projections 36 are defined in the bottom surface 38 of file protect ring, generally denoted by reference numeral 40. The arrangement of recesses 34 (shown in the context of a third embodiment in FIGS. 6 and 7) within bottom wall 32 of channel 22 is unique to each reel 10. Therefore, one and only one file protect ring 40, having a corresponding and mating second plurality of projections 36, can fit with any given reel 10 to provide a flushly mounted surface as part of inside surface 20 of reel 10. Thus, if an incorrectly coded file protect ring 40 were to be inserted in channel 22, its upper surface 42 would not fit flushly with side 20 of reel 10 and would in all probability prevent reel 10 from either being mounted on spindle 16 at all, or at least cause reel 10 to wobble or periodically actuate switch 24. The net result would be to prevent reel 10 from being erased or written upon or at least substantially interfere with any practical use of reel 10.

A second embodiment of reel 10 is illustrated in FIG. 3 wherein bottom surface 32 of channel 22 has a plurality of projections 44 defined thereon. In the case where the file protect ring is removed, rod 26 will project to its maximum extent into channel 22 between adjacent projections 44. Rotation of reel 10 will ultimately cause one of the projections 44 to physically collide with rod 26 or at the very least cause intermittant actuation of switch 24. Thus, where bottom wall 32 of channel 22 is manufactured with such projections, not only will the erasure of or recording on tape 10 be prevented, but the reading of any information contained on the tapes spooled on reel 10, will also be prevented.

FIG. 3 illustrates in perspective view, a corresponding and mating file protect ring 46 showing a plurality of recesses 48 defined in the lower surface 50 of ring 46 which are uniquely coded to the projections 44 defined in bottom wall 32 of channel 22. In the case of either the first or second embodiments of FIGS. 2 and 5 on one hand and FIGS. 3 and 4 on the other, the first plurality of surfaces defined in bottom wall 32 of channel 22 are simply the three-dimensional reverse or negative of the corresponding and mating surfaces defined in the corresponding file protect rings. In fact, bottom wall 32 of channel 22 can be machined to provide a unique coding and the pliable file protect ring manufactured by using the uniquely machined channel as a mold.

It is clear that in the case of the second embodiment of FIGS. 3 and 4, where projections from bottom surface 32 are used as a means for coding, that a conventional, flat surfaced file protect ring cannot be inserted at all within annular channel 22. In the preferred embodiment, projections 44 extend substantially to the upper edge of annular channel 22 flush with inside surface 20 of reel 10. However, in the case of the first embodiment of FIGS. 2 and 5, where identations are provided below the normal surface of bottom wall 32, a conventional file protect ring can still be inserted. Therefore, the preferred embodiment of the recessed coding illustrated in FIGS. 2 and 5 is actualized in the embodiment shown in plan view in FIG. 6 and in perspective view in FIG. 7.

Referring particularly now to FIG. 6, a collar 52 is provided and extends upwardly from bottom wall 32 and is disposed adjacent to inner sidewall 30 of channel 22. Thus, the width of channel 22 is decreased as defined by that distance between the outside surface 54 of collar 52 and outer sidewall 28 of channel 22. A conventional file protect ring will thus have an inside diameter which is too large to fit within channel 22 when a reel 10 has been fitted with collar 52.

Although it has been contemplated in the above description that tape reel 10 will have bottom wall 32 coded with either recesses, projections, or both upon its original manufacture, it is expressly included within the scope of the present invention that a coding insert for retrofitting conventional tape reels can also be devised. For example, referring to FIG. 7 a coding insert 56, in isolation of reel 10 of a type adapted for retrofitting the embodiment of FIG. 6, is shown in enlarged scale and in perspective view. Insert 56 includes as an integral collar 52 and a bottom annular plate 58 having an outer and inner diameter designed to slip fit within channel 22 of a conventional tape reel. In the embodiment illustrated in FIG. 7, recesses 34 have been defined in plate 58 to provide the unique coding required. Thus, insert 56 may either be tightly slip fitted within channel 22 or otherwise conventionally affixed by means of adhesive to bottom wall 32 of channel 22. When glued or bonded to channel 22, insert 56 cannot be removed without considerable difficulty and destruction of the insert itself. A conventional file protect ring cannot be flushly inserted in a channel provided with insert 56 of FIG. 7, due not only to the smaller inside diameter required of the file protect ring by means of collar 52, but also due to the shallower channel depth necessitated by the thickness of plate 58. Instead of recesses 34, plate 58 could similarly be provided with a plurality of projections of the type illustrated in connection of the embodiment of FIG. 3 and 4, or equivalently with a combination of recesses and projections. In the case of a retrofitting ring having projections, collar 52 can be omitted, and a conventional file protect ring will still not be useable with a tape reel retrofitted with an insert having such projections.

It must be understood that many alterations and modifications may be made by those having ordinary skill in the art without departing from the spirit and scope of the present invention. For example, although the recesses and projections have been shown in the form of simple lugs, lug-shaped recesses, ridges or ridge-shaped valleys, any three dimensional form could be equivalently substituted such as spirals or coded lengths of consecutive series of circular ridge-shaped segments or recesses. Similarly, although the coded surfaces have been described as entirely formed within bottom wall 32 it is also possible that three-dimensional coding shapes could be provided on either or both of sidewalls 28 and 30, or in the case of a retrofitted ring such as that shown in FIG. 7 on surface 54 of collar 52. In addition, although collar 52 has been shown as formed adjacent to inside sidewall 30, it could also be equivalently placed adjacent to outside sidewall 28. It is not strictly necessary that collar 52 be a continuous collar which completely encircles sidewall 30, but could be one or more semicircular segments. In that case, a conventional file protect ring could still not be inserted within channel 22 even where the unique code consisted solely of a series of indentations in bottom wall 32 as in the embodiment to FIGS. 2 and 5, or in base plate 58 as in the embodiment of FIGS. 6 and 7. In the extreme, collar 52 could be reduced to a single, standardized post, lug or segment placed anywhere within channel 22. Such a post or segmented collar would also provide a convenient means for indexing the coding pattern of the file protect ring to its corresponding and mating coding pattern defined in bottom wall 32 or plate 58.

The embodiments specifically described above have been set forth only for the purposes of example and clarity and should not be taken in any way as limiting the scope of the following claims.

We claim:

1. An improvement in a magnetic tape reel, said reel including a center opening for receiving a spindle, an annular channel defined by smooth generally circular sidewalls concentric with said center opening and a bottom wall generally perpendicular to said sidewalls for receiving a switch actuator having a path of movement between a switch actuating position generally flush with an upper side of said reel approximately in the plane of the upper edge of said annular channel and a switch nonactuating position within said channel, said annular channel for positioning a file protect ring with respect to said switch actuator in said switch actuating position when said file protect ring is disposed in said channel, said improvement comprising;

a first plurality of surfaces selectively defined in said bottom wall of said annular channel; and a second plurality of surfaces defined in a bottom surface of said file protect ring disposed adjacent to said bottom wall of said channel when said file protect ring is disposed in said channel, said second plurality of surfaces corresponding with and mating with said first plurality of surfaces defined in said bottom wall, the correspondence between said first and second plurality of surfaces having a one-to-one relationship, whereby said file protect ring can be disposed in said annular channel only in one, unique position as defined by the unique mating of first and second plurality of surfaces, otherwise said file protect ring not being disposable in said annular channel in a completely flush position with said upper side of said reel, whereby each magnetic tape reel is uniquely keyed to a corresponding file protect ring.

2. The improvement of claim 1 wherein said first plurality of surfaces is a plurality of selectively formed recesses in said bottom wall of said annular channel, and wherein said second plurality of surfaces is a corresponding and mating plurality of projections formed in said bottom surface of said file protect ring.

3. The improvement of claim 1 or 2 wherein said first plurality of surfaces on said bottom walls of said annular channel includes a plurality of projections, and said second plurality of surfaces on said bottom surface of said file protect ring includes a corresponding and mating plurality of recesses.

4. The improvement of claim 3 wherein said file protect ring is formed by molding said file protect ring in said annular channel.

5. The improvement of claim 1 further including an annular collar disposed in said annular channel and concentric therewith, said annular collar disposed on at least one of said circular sidewalls thereby decreasing the width of said annular channel defined by the distance between said collar and an opposing circular sidewall, whereby a conventional file protect ring cannot be disposed within said annular channel due to obstruction provided by said annular collar.

6. The improvement of claim 3 wherein said projections extend from said bottom wall approximately to the upper edge of said annular channel thereby blocking said annular channel to provide an obstruction to rotation of said magnetic tape reel by virtue of movement of said switch actuator into said nonactuating position in said channel and contact with at least one of said plurality of projections.

7. An apparatus for retrofitting a magnetic tape reel, said tape reel including a central opening for receiving a spindle, an annular channel defined by smooth generally circular sidewalls concentric with said central opening and a smooth bottom wall generally perpendicular to said sidewalls, said annular channel for receiving a switch actuator having a path of movement between a switch actuating position generally flush with the upper side of said reel approximately lying in the plane of the upper edge of said annular channel and a switch nonactuating position in said annular channel, said annular channel for gripping a file protect ring, said file protect ring for positioning said switch actuator in said switch actuating position, said apparatus for retrofitting comprising:

an annular insert disposable in said annular channel on said smooth bottom wall, said insert being concentric with said central opening when disposed in said annular channel and having defined therein a first plurality of surfaces wherein each surface of said first plurality of surfaces has a selective vertical displacement from said smooth bottom wall of said annular channel; and a second plurality of corresponding and mating surfaces defined on the bottom surface of said file protect ring, said bottom surface of said file protect ring being disposed adjacent to said surface of said insert having said first plurality of surface defined therein, said first and second plurality of surfaces each corresponding in a one-to-one mating relationship such that said file protect ring is disposable in said annular channel with said insert in place only when said first and second plurality of surfaces are appropriately aligned and are corresponding in a one-to-one relationship.

8. The apparatus of claim 7 wherein said first plurality of surfaces are recesses selectively defined in said insert, and said second plurality of surfaces are corresponding and mating projections selectively defined in said file protect ring.

9. The apparatus of claim 7 or 8 wherein said first plurality of surfaces are projections defined in said insert and said second plurality of surfaces are corresponding and mating recesses defined in said bottom surface of said file protect ring.

10. The apparatus of claim 9 wherein said projections defined in said insert extend from said insert substantially to said side of said reel approximately flush with the upper edge of said annular channel.

11. The apparatus of claim 7 further comprising an annular sidewall formed as part of said insert, said annular sidewall of said insert disposed substantially adjacent to and concentric with one of said generally circular sidewalls of said annular channel so that the width of said annular channel is decreased, said width being defined by the distance between said annular sidewall of said insert and said opposing circular sidewall of said annular channel, whereby a conventional file portect ring cannot be disposed in said annular channel with said insert in place.

* * * * *